United States Patent
Chiang et al.

(10) Patent No.: US 8,550,030 B2
(45) Date of Patent: Oct. 8, 2013

(54) OVERSPRAY RECLAIMING SYSTEM

(75) Inventors: Pei-Wei Chiang, Yun-lin Hsien (TW);
Shi-Hsien Yeh, Yun-lin Hsien (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 13/151,969

(22) Filed: Jun. 2, 2011

(65) Prior Publication Data
US 2012/0308732 A1 Dec. 6, 2012

(51) Int. Cl.
*B05B 1/28* (2006.01)
*B05C 11/00* (2006.01)
*B05C 13/02* (2006.01)

(52) U.S. Cl.
USPC ....... 118/326; 118/602; 118/500; 118/DIG. 7

(58) Field of Classification Search
USPC .............. 118/326, 309, 634, 50, DIG. 7, 300, 118/500, 602; 454/50, 53; 55/DIG. 46; 473/378, 409; 427/345, 427.1
See application file for complete search history.

(56) References Cited

U.S. PATENT DOCUMENTS

| | | | | |
|---|---|---|---|---|
| 2,471,506 A | * | 5/1949 | Wiswall | 134/98.1 |
| 3,785,387 A | * | 1/1974 | Ross | 134/95.2 |
| 3,870,375 A | * | 3/1975 | Duncan et al. | 406/127 |
| 4,294,191 A | | 10/1981 | Loof | |
| 4,354,451 A | | 10/1982 | Vohringer et al. | |
| 4,607,592 A | | 8/1986 | Richter | |
| 4,754,770 A | * | 7/1988 | Fornasari | 134/57 D |
| 5,078,084 A | * | 1/1992 | Shutic et al. | 118/309 |
| 5,092,928 A | | 3/1992 | Spangler | |
| 5,334,255 A | | 8/1994 | James et al. | |
| 5,453,301 A | | 9/1995 | Saatweber et al. | |
| 5,500,271 A | | 3/1996 | Pasch et al. | |
| 5,769,703 A | | 6/1998 | Conlin | |
| 5,891,524 A | | 4/1999 | Erukulla | |
| 6,544,337 B1 | | 4/2003 | Skrabski et al. | |
| 6,571,812 B1 | * | 6/2003 | Lavoie et al. | 134/191 |
| 2002/0000191 A1 | | 1/2002 | Yamane | |
| 2003/0221615 A1 | * | 12/2003 | Lastowka | 118/679 |
| 2007/0190261 A1 | | 8/2007 | Darnell | |
| 2008/0021374 A1 | * | 1/2008 | Kawata | 604/23 |
| 2010/0151971 A1 | | 6/2010 | Mydlack et al. | |
| 2010/0298069 A1 | | 11/2010 | Goodwin et al. | |

FOREIGN PATENT DOCUMENTS

| | | |
|---|---|---|
| DE | 2620673 | 12/1977 |
| DE | 3202481 | 1/1983 |

OTHER PUBLICATIONS

Extended European Search Report and Written Opinion in European Patent Application No. EP12169778.3, mailed on Oct. 29, 2012.
Response to Communication pursuant to Rules 70(2) & 70a(2) EPC issued Dec. 10, 2012 for European Patent Application No. 12169778.3, as filed on Jun. 4, 2013.

* cited by examiner

*Primary Examiner* — Yewebdar Tadesse
(74) *Attorney, Agent, or Firm* — Plumsea Law Group, LLC

(57) ABSTRACT

An overspray reclaiming system is disclosed. The system may collect and reuse overspray produced when discharging material on an object to create a coating on the outer surface of the object. The system may generally include a housing in which an object may be sprayed, a holder for holding the object, a discharging device for discharging coating material onto an object, a vessel for collecting and/or treating overspray, and conduits and flow controllers for directing overspray to be reused. The discharging device and the holder object may be disposed within the housing. At least one porous material may be disposed between the discharging device and a wall of the housing.

21 Claims, 8 Drawing Sheets

OVERSPRAY RECLAIMING SYSTEM

BACKGROUND

Embodiments of the present invention relate generally to a system and method for spraying an object with paint and reclaiming the overspray.

The game of golf is an increasingly popular sport at both amateur and professional levels. A wide range of technologies related to the manufacture and design of golf balls are known in the art. For instance, a method of manufacturing golf balls involves spraying golf balls with coating material. This method achieves an even coating on the surface of the golf ball. However, much of the coating material is lost as overspray during the spraying process. It would be advantageous to be able to collect and reuse the overspray.

SUMMARY

An overspray reclaiming system is disclosed. The system may collect and reuse overspray produced when discharging material on an object to create a coating on the outer surface of the object. The system may generally include a housing in which an object may be sprayed, a holder for holding the object, a discharging device for discharging coating material onto an object, a vessel for collecting and/or treating overspray, and conduits and flow controllers for directing overspray to be reused. The discharging device and the holder may be disposed within the housing. At least one porous material may be disposed between the discharging device and a wall of the housing.

In one aspect, an embodiment of the system may include a housing having a wall. A discharging device and a holder may be disposed within the housing. At least one porous material may be disposed between the discharging device and the wall. The holder may be configured to hold a golf ball. The holder may be a spindle. The discharging device may have a spray nozzle. The porous material may be a net. The system may include between two and ten porous materials disposed between the discharging device and the wall. The distance between the porous materials may be within a range of about 0.5 cm to 10 cm. The porous materials may have a pore size within a range of about 0.5 mm to 5 mm. The wall may be sloped. The system may include a pump having a nozzle positioned to spray solvent onto the wall. A tank may be disposed beneath a floor of the housing, and the housing may include a drain opening into the first tank. A tube may be connected to the tank and in fluid communication with the discharging device.

In another aspect, an embodiment of the system may include a housing having a floor. A discharging device may be disposed within the housing. A holder may be disposed within the housing. A first tank may be disposed beneath the floor of the housing. A drain may be disposed between the housing and the first tank. The holder may be configured to hold a golf ball. The holder may be a spindle. The discharging device may have a spray nozzle. The porous material may be a net. The first tank may include a nonstick surface. The system may include a pump having a nozzle positioned to spray solvent inside the first tank. The first tank may be in fluid communication with the discharging device. The system may include a second tank for supplying coating material disposed beneath the floor of the housing. The first tank and the second tank may both be in fluid communication with the discharging device. A first tube may be in fluid communication with the supply tank. A second tube may be in fluid communication with the collection tank. A first valve may include a first inlet connected to the first tube, a second inlet connected to the second tube, and an outlet for mixing the flow from the first tube with the flow from the second tube. The outlet may be connected to a third tube in fluid communication with the discharging device. A second valve may be disposed within the second tube.

In another aspect, an embodiment of the system may include a method of recycling overspray. The method may include spraying coating material onto an object inside the housing, pumping solvent into a housing, draining overspray from the housing into a tank, mixing the overspray with new coating material to form a mixture, and spraying the mixture onto an object inside the housing. The method may include capturing the overspray with porous materials. The mixture may include a ratio of overspray to new coating material in the range of about 20:80 to 80:20. The method may include using a valve to control the ratio of overspray to new coating material in the mixture. The method may include adding solvent to the tank. The method may include filtering the overspray.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

A system for spraying an object and reclaiming the overspray for reuse is disclosed. The system may be configured to coat an object by spraying material onto the object. To enhance even coating, the particles of coating material may be discharged over a surface area that is larger than the surface area of the object being sprayed. Discharging material over such a large surface area may cause discharged material particles to continue past the object without contacting the object. Any discharged material particles that do not land on or stick to the object may be considered overspray. The disclosed system may collect and reuse the overspray to avoid waste. While the disclosed embodiments illustrate the system being used to coat golf balls, the system may be used to coat a variety of different types of objects. For example, the system may be used to coat automobile parts.

While the disclosed embodiments illustrate the system being used to coat golf balls with paint, the coating material used by the system may include a variety of different coating materials. For example, the system may use protective coatings or any other type of known coating material. The coating material may be in a liquid and/or powder form. In some embodiments, the coating material may contain volatile organic compounds (VOCs). The coating material may be soluble in various solvents, including cyclohexane, cyloalkene, water, aliphatic hydrocarbons, ethyl acetate, glycol ethers, acetone, or any other known solvent.

Figure 1:
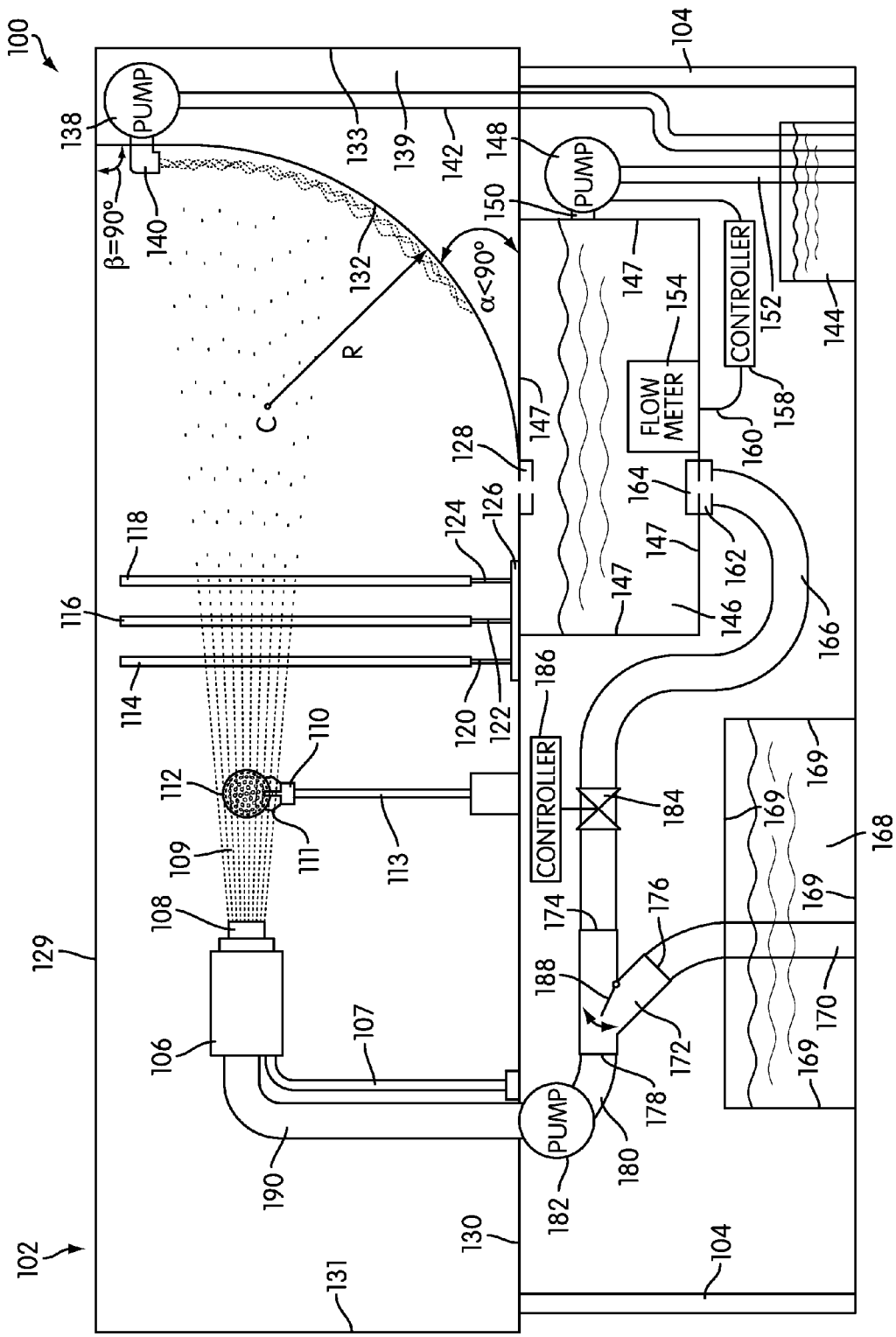
FIG. 1 is side view of an exemplary embodiment of an overspray reclaiming system.

FIG. 1 shows an exemplary embodiment a system 100 for spraying an object and reclaiming the overspray for reuse. System 100 may generally include a housing in which an object may be sprayed, a holder for holding the object, a discharging device for discharging coating material onto an object, a vessel for collecting and/or treating overspray, and conduits and flow controllers for directing overspray to be reused.

Figure 2:
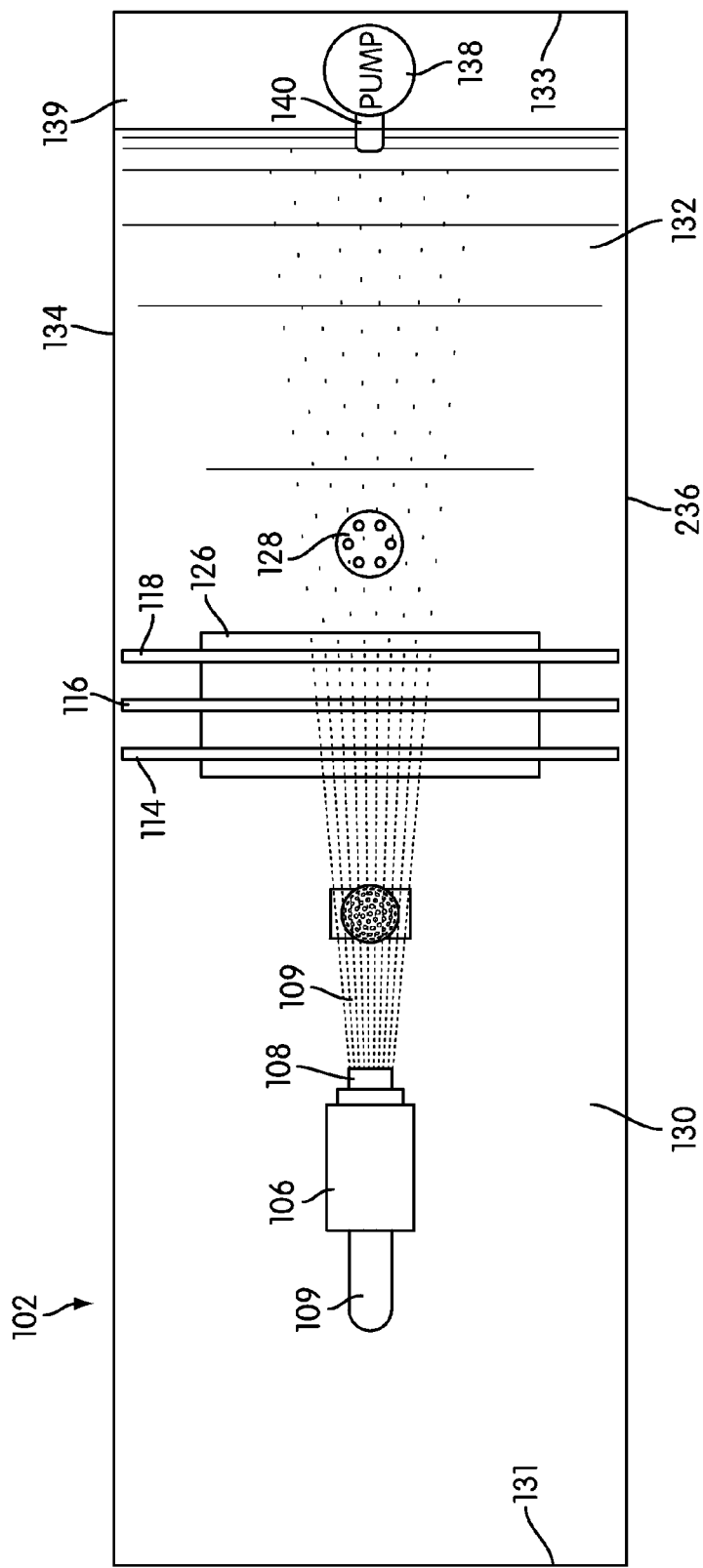
FIG. 2 is a top view of the inside of the booth of the overspray system shown in FIG. 1.
Figure 3:
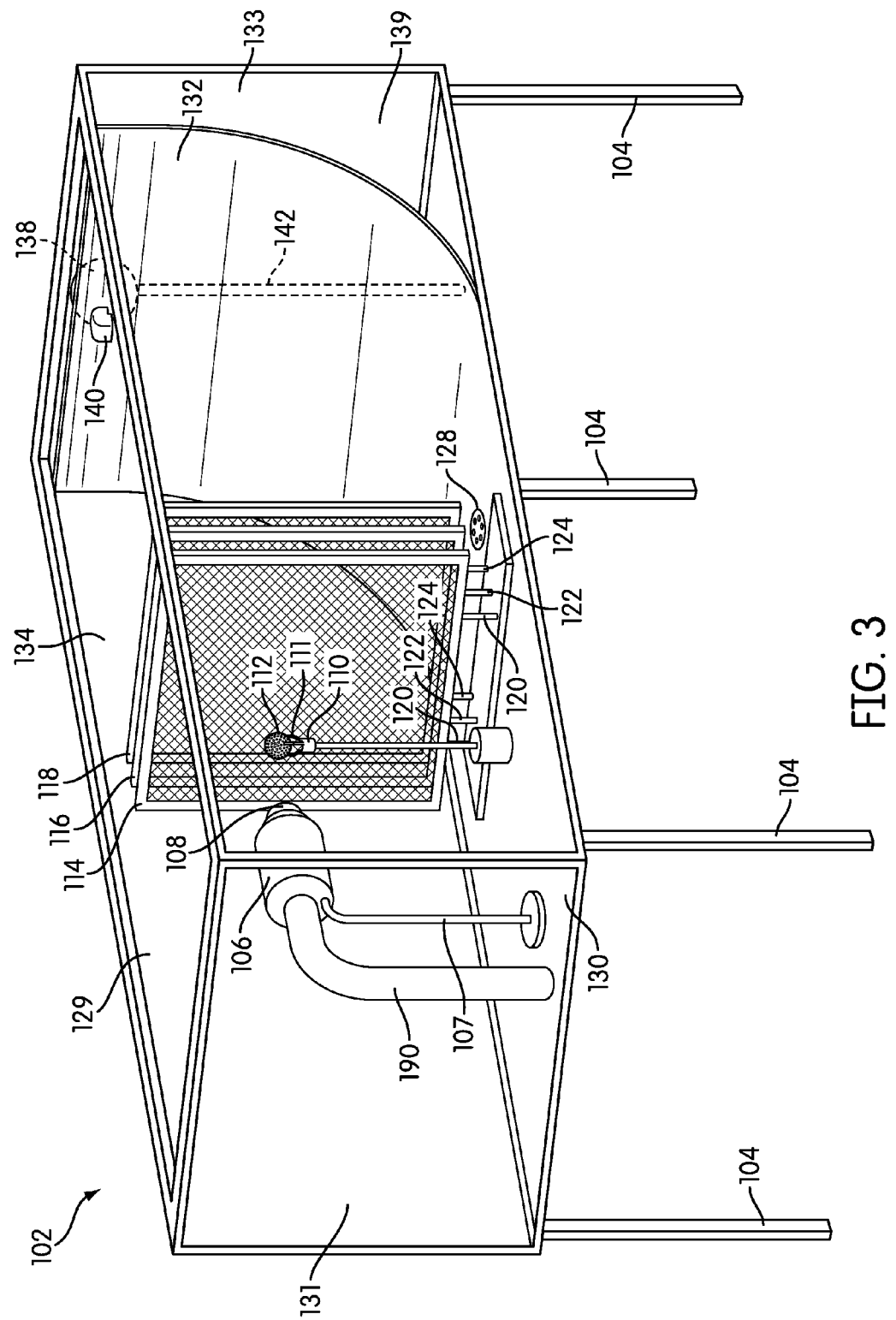
FIG. 3 is a perspective view of the booth of the overspray system shown in FIG. 1.

The housing may include any type of enclosed space. As shown in FIGS. 1-3, in some embodiments, the housing may be a booth 102. FIG. 2 is a top view inside booth 102. Booth 102 may be enclosed by a ceiling 129, a floor 130, a first wall 131, a second wall 133, a third wall 134, and a fourth wall 236. FIG. 3 is a perspective view of booth 102 with first wall 131 and fourth wall 236 being transparent to show inside booth 102. Booth 102 may include a sloped wall 132 to direct the overspray (through accumulation and gravity) to run down toward a booth drain 128 in floor 130. As shown in FIGS. 1 and 3, sloped wall 132 may be attached to ceiling 129 at one end and floor 130 at another end. Angle β, the angle formed between ceiling 129 and an end of sloped wall 132, may be a right angle. In some embodiments, angle β may be less than 90°. Angle α, the angle formed between floor 130 and another end of sloped wall 132, may be less than 90°. In some embodiments, angle α may be 90°. Sloped wall 132 may curve as it approaches floor 130 such that sloped wall 132 has a radius of curvature R. In some embodiments, sloped wall 132 may be flat without a radius of curvature.

As shown in FIGS. 1-3, booth 102 may include a compartment 139 enclosed by sloped wall 132, second wall 133, a portion of ceiling 129, and a portion of floor 130. As discussed below, compartment 139 may house a pump 138 and a tube 142. In some embodiments, compartment 139 may house other components of system 100. For example, compartment 139 may house replacement parts to the components used inside booth 102. In some embodiments, second wall 133 may be absent and booth may be enclosed by sloped wall 132 instead of second wall 133. In some embodiments, booth 102 may include more than one sloped wall. For example, first side wall 134 and second side wall 236 of booth 102 may also include sloped walls. In another example, all of the walls may be curved. For example, in an embodiment shown in FIG. 4, a booth 402 may be formed entirely by a continuous curved wall 431 with a curved floor 430 causing booth 402 to be substantially sphere-shaped. Floor 430 may be curved around a drain 428 with drain 428 located at the lowest point of floor 430.

Referring back to FIGS. 1-3, ceiling 129, floor 130, first wall 131, second wall 133, third wall 134, fourth wall 236, and sloped wall 132 may be made of any material known in the art, such as metal, glass, or plastic materials. In some embodiments, one or more walls of booth 102, including floor 130 and ceiling 135, may be made of different materials. For example, first wall 131 may be made of metal while second wall 234 is made of plastic. In some embodiments, one or more walls of booth 102, including floor 130 and ceiling 135, may be transparent to allow the inside of booth 102 to be viewed from outside booth 102. In some embodiments, one or more walls of booth 102 may be made of any known material that is incompatible with the coating material so that coating material does not stick to the walls. For example, sloped wall 132 may be made of silicone. In some embodiments, one or more walls of booth 102 may include a nonstick coating. For example, floor 130 and sloped wall 132 may include a nonstick coating. The nonstick coating may include any known material that is incompatible with the coating material. For example, the nonstick coating may include polytetrafluoroethylene (PTFE) or silicone. In some embodiments, booth 102 may include legs 104 for elevating booth 102 above floor level.

In some embodiments, booth 102 may include transparent windows through which the inside of booth may be monitored from the outside of booth 102. The transparent windows may include any known material, including glass or plastic. In some embodiments, booth 102 may include a ventilation system for allowing air to enter booth 102 from outside booth 102. Booth 102 may include ports or doors allowing access inside booth 102. For example, a door may be included in second wall 133 to allow access to pump 138 and tube 142. In some embodiments, such as when the coating material is made of VOCs, the booth may be sealed to prevent evaporation of the VOCs. In some embodiments, booth 102 may be sealed to prevent environmental contamination of the interior space. In some embodiments, booth 102 may be sealed to control the spraying conditions.

As mentioned above, the system may include a discharging device for discharging coating material onto an object. The discharging device may include any known type of device capable of discharging fluid. For example, the discharging device may include an atomizer or sprayer. As shown in the embodiment of FIG. 1, the discharging device may be a spray gun 106. Spray gun 106 may include a spray gun nozzle 108 for spraying coating material on an object. Spray gun 106 may be in fluid communication with a spray gun tube 190. Spray gun tube 190 may put spray gun 106 in fluid communication with a supply of coating material, as discussed in more detail below. Spray gun 106 may include a spray gun stand 107 for positioning spray gun 106 on floor 130. Spray gun 106 may be removably connected to spray gun stand 107. Spray gun 106 may be configured to move back and forth and/or up and down as spray gun 106 sprays an object. This motion may aid in coating an object with an even layer of coating material. In some embodiments, multiple discharging devices may be used. For instance, system 100 may include two or three spray guns in different locations within booth 102.

As mentioned above, the system may include a holder for holding the object to be sprayed. The holder may include any known type of holder. For example, the holder may be a cradle on a stand positioned on the floor of the housing or a clamp hanging from the ceiling of the housing. As shown in the embodiment of FIG. 1, the holder may be a spindle 110 disposed within booth 102. Spindle 110 may include a spindle stand 113 for positioning spindle 110 on floor 130. Spindle 110 may be removably connected to spindle stand 113.

In some embodiments, system 100 may be configured to coat a golf ball with paint. Thus, spindle 110 may be configured to receive a golf ball 112. Spindle 110 may include fingers 111 configured to receive a golf ball 112. Spindle 110 may be positioned so that it holds golf ball 112 in front of spray gun nozzle 108. As shown in FIGS. 1 and 2, this positioning may place golf ball 112 in the path 109 of the paint as it leaves spray gun nozzle 108, thus allowing spray gun 106 to spray golf ball 112 with paint. In some embodiments, the holder may be configured to rotate or move an object to facilitate coating the object with material. For example, spindle 110 may be configured to rotate golf ball 112 about a longitudinal axis of stand 113 to facilitate coating golf ball 112 with an even coat of paint. In some embodiments, spindle 110 and spindle stand 113 may be positioned in a chain conveyer system. The chain conveyer system may comprise 10 to 150 sets of spindles and spindle stands.

Figure 6:
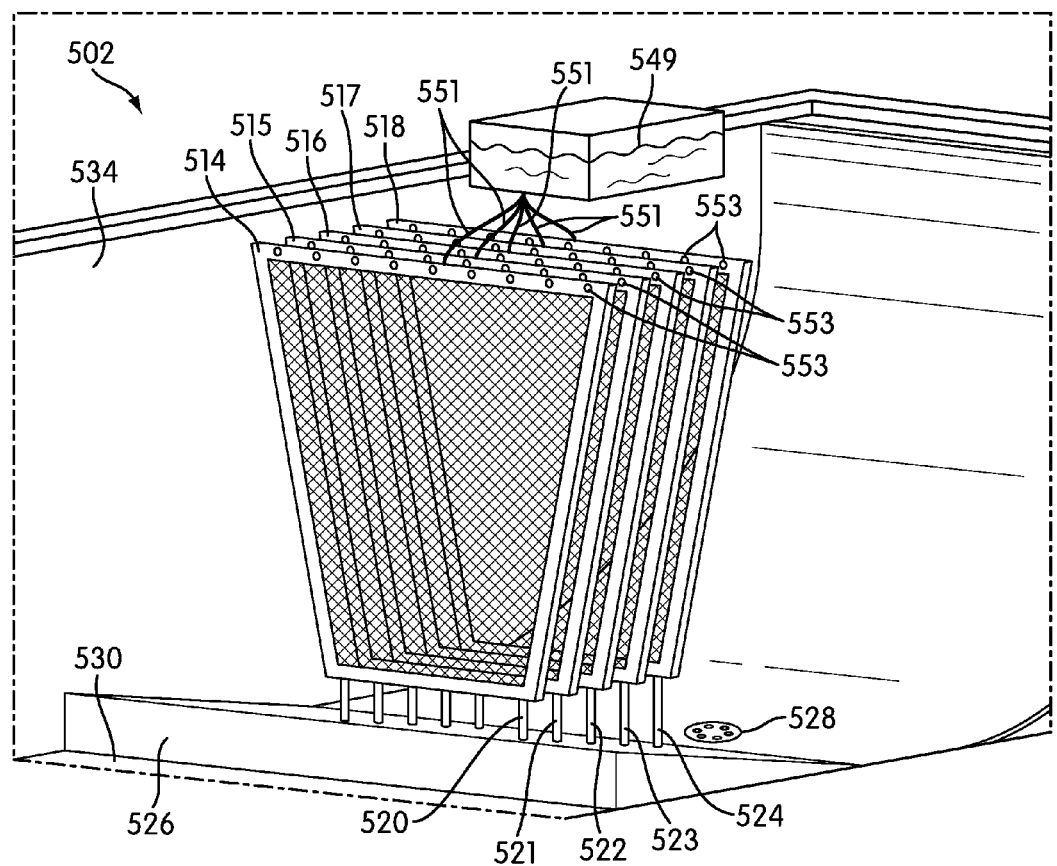
FIG. 6 is a partial perspective view of the exemplary embodiment shown in FIG. 5.
Figure 7:
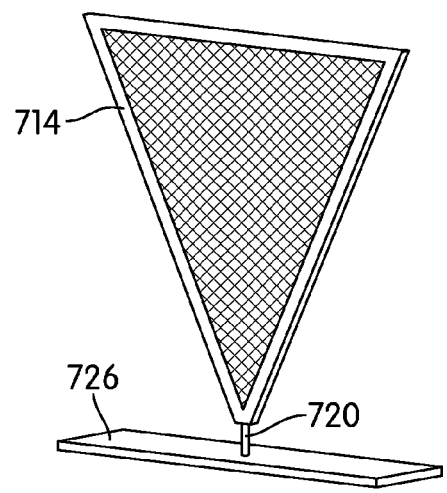
FIG. 7 is an exemplary embodiment of a net.
Figure 8:
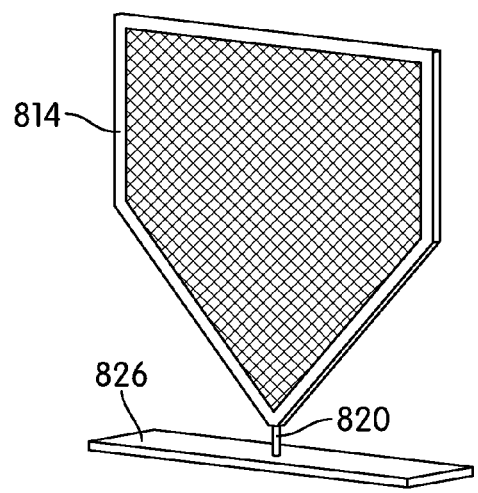
FIG. 8 is an exemplary embodiment of a net.
Figure 9:
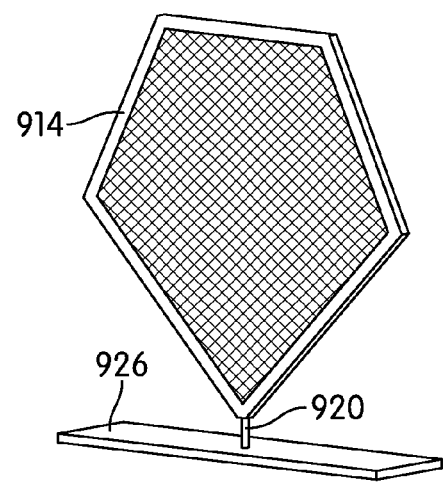
FIG. 9 is an exemplary embodiment of a net.

A porous material may be disposed adjacent the object to be sprayed. The porous material may be positioned on a side opposite the discharging device. The porous material may be made of any known material capable of catching overspray while still allowing a portion of overspray to flow through the porous material. For example, the porous material may include a screen, a filter, or a sheet of metal having holes punched in it. As shown in the embodiment of FIG. 1, system 100 may include a first net 114, second net 116, and third net 118 disposed between golf ball 112 and sloped wall 132 to catch overspray as spray gun 106 sprays golf ball 112. First net 114, second net 116, and third net 118 may also reduce air pressure of the sprayed paint. First net 114, second net 116, and third net 118 may include rectangular nets. In some embodiments, the nets may include other shapes. For example, in some embodiments, the nets may include a broad top and may taper toward the bottom. Such a shape may help direct overspray caught by the nets toward a centralized location beneath the nets. FIGS. 6-9 show embodiments in which nets may have a broad top and taper toward the bottom of the nets. FIG. 6 displays nets that taper from the top to the bottom. FIG. 7 displays a triangular net 714 including a leg 720 connecting triangular net 714 to a base 726. FIG. 8 displays a net 814 that tapers from the middle to the bottom and includes a leg 820 connecting net 814 to a base 826. FIG. 9 displays a net 914 that widens from the top to the middle and then tapers from the middle to the bottom. A leg 920 connects net 914 to a base 926.

Figure 5:
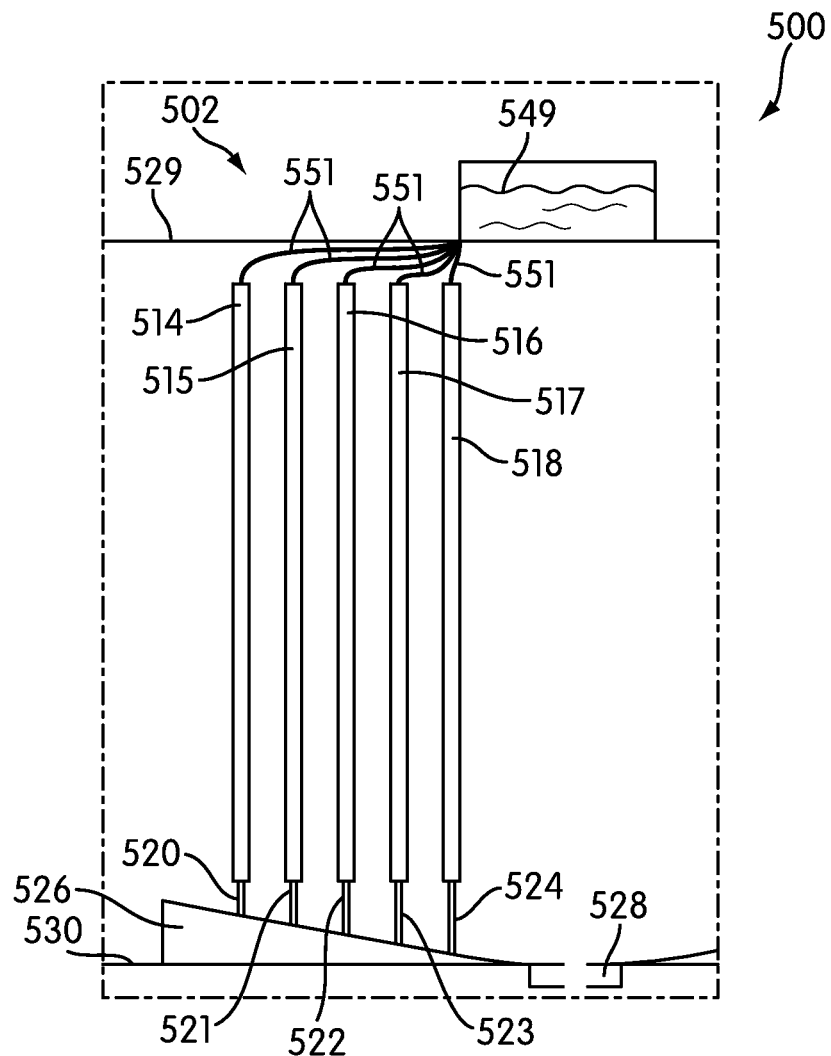
FIG. 5 is a partial side view of an exemplary embodiment of an overspray reclaiming system.

Referring back to FIG. 1, first net 114, second net 116, and third net 118 may stand vertically within booth 102. In some embodiments, the nets may be positioned so that they are angled with respect to floor 130. According to the embodiment shown in FIG. 1, system 100 may include three nets. However, in other embodiments, the system may include any number of nets. For example, in one embodiment, the system may include one net. In another embodiment, as shown in FIGS. 5 and 6, the system may include five nets. In yet another embodiment, the system may include ten nets.

The pore sizes of the nets may be selected based on a variety of factors. For example, the pore sizes may be selected based on the number of nets, the type of coating material used, the percentage of coating material to be reclaimed, or the type of object being coated. In the embodiment of FIGS. 1-3, first net 114, second net 116, and third net 118 may each include a pore size range of about 0.5 mm to 5 mm. In some embodiments, first net 114, second net 116, and third net 118 may all have the same pore size. In other embodiments, first net 114, second net 116, and third net 118 may have different pore sizes. For example, first net 114 may have a pore size of 5 mm while second net 116 has a pore size of 2 mm and third net 118 has a pore size of 0.5 mm. In other embodiments, the pore size of first net 114 is bigger than that of second net 116, and the pore size of second net 116 is bigger than that of third net 118.

In some embodiments, one or more of first net 114, second net 116, and third net 118 may include a nonstick coating to facilitate cleaning the nets by preventing paint from building up on the nets. For example, first net 114 and second net 116 may include a nonstick coating. The nonstick coating may include any known material that is incompatible with the coating material. For example, the nonstick coating may include polytetrafluoroethylene (PTFE) or silicone. In some embodiments, first net 114, second net 116, and third net 118 may be cleaned with solvent and/or replaced after overspray builds up on first net 114, second net 116, and third net 118.

The distances between the nets may be set based on a variety of factors. For example, the distances may be set based on the size of the pores, the number of nets, the type of coating material used, the percentage of coating material to be reclaimed, or the type of object being coated. In the embodiment of FIG. 1, first net 114, second net 116, and third net 118 may be within a range of about 0.5 cm to 10 cm. In some embodiments, first net 114, second net 116, and third net 118 may be spaced apart an equal distance. In other embodiments, first net 114, second net 116, and third net 118 may be spaced apart at different distances. For example, first net 114 may be disposed 5 cm from second net 116 while third net 118 is disposed 1 cm from second net 116. In some embodiments, the distance between first net 114 and second net 116 is larger than the distance between second net 116 and third net 118. To facilitate maintaining these distances, first net 114, second net 116, and third net 118 may be connected by a common base 126. First net 114 may include first legs 120 connecting first net 114 to common base 126. To allow removal and/or replacement of first net 114 without removing and/or replacing the other nets, first net 114 may be removably attached to first legs 120 or common base 126. Second net 116 may include second legs 122 connecting second net 116 to common base 126. To allow removal and/or replacement of second net 116 without removing and/or replacing the other nets, second net 116 may be removably attached to second legs 122 or common base 126. Third net 118 may include third legs 124 connecting third net 118 to common base 126. To allow removal and/or replacement of third net 118 without removing and/or replacing the other nets, third net 118 may be removably attached to third legs 124 or common base 126.

In some embodiments, common base may include a slanted shape. FIGS. 5 and 6 show an exemplary embodiment of a system 500 in which a common base 526 may include a slanted shape sloping toward a booth drain 528 to direct the overspray (through accumulation and gravity) to run down toward booth drain 528 in a floor 530. First net 514 may include first legs 520 connecting first net 514 to common base 526. To allow removal and/or replacement of first net 514 without removing and/or replacing the other nets, first net 514 may be removably attached to first legs 520 or common base 526. Second net 515 may include second legs 521 connecting second net 515 to common base 526. To allow removal and/or replacement of second net 515 without removing and/or replacing the other nets, second net 515 may be removably attached to second legs 521 or common base 526. Third net 516 may include third legs 522 connecting third net 516 to common base 526. To allow removal and/or replacement of third net 516 without removing and/or replacing the other nets, third net 516 may be removably attached to third legs 522 or common base 526. Fourth net 517 may include fourth legs 523 connecting fourth net 517 to common base 526. To allow removal and/or replacing of fourth net 517 without removing and/or replacing the other nets, fourth net 517 may be removably attached to fourth legs 523 or common base 526. Fifth net 518 may include fifth legs 524 connecting fifth net 518 to common base 526. To allow removal and/or replacement of fifth net 518 without removing and/or replacing the other nets, fifth net 518 may be removably attached to fifth legs 524 or common base 526.

Referring back to FIG. 1, in some embodiments, first net 114, second net 116, and third net 118 may be disposed on individual bases. In some embodiments, spray gun stand 107 may be connected to common base 126 to maintain distances between spray gun 106 and the nets. To allow removal and/or replacement of spray gun 106 without removing and/or replacing all of the components attached to common base 126, spray gun 106 may be removably attached to spray gun stand 107 or common base 126. In some embodiments, spindle stand 113 may be connected to common base 126 to maintain distances between spindle 110 and the nets. To allow removal and/or replacement of spindle 110 without removing and/or replacing all of the components attached to common base 126, spindle 110 may be removably attached to spindle stand 113 or common base 126.

Figure 4:
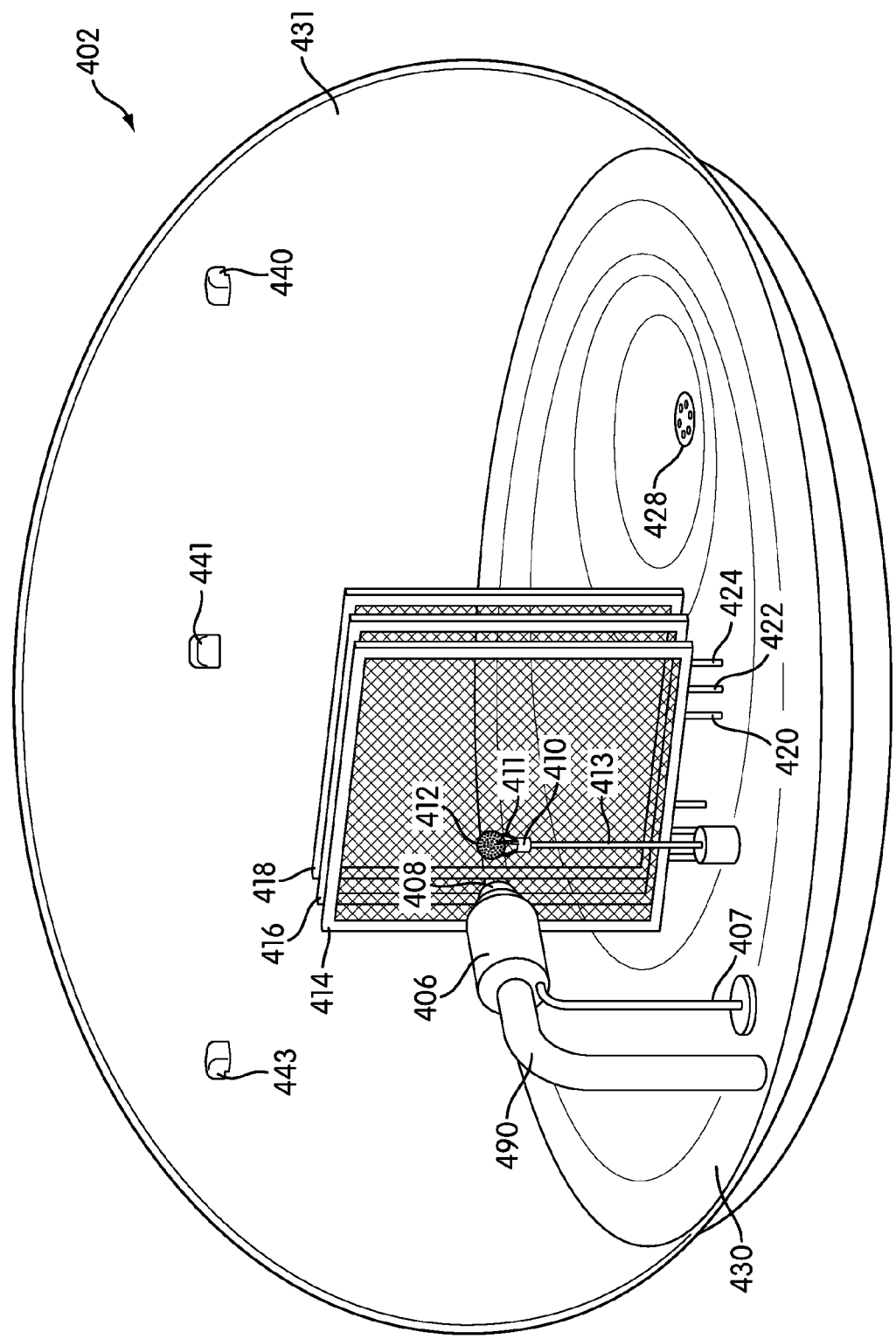
FIG. 4 is a perspective view of an exemplary embodiment of a booth of an overspray reclaiming system.

In some embodiments, first net 114, second net 116, and third net 118 may be directly connected to floor 130 of booth 102. FIG. 4 shows an exemplary embodiment in which a first net 414, a second net 416, and a third net 418 may be connected directly to floor 430. Similar to the embodiment of FIGS. 1-3, the embodiment of FIG. 4 may include a spray gun 406 having a spray gun nozzle 408 for coating an object. Spray gun 406 may be in fluid communication with a spray gun tube 490. Spray gun tube 490 may put spray gun 406 in fluid communication with a supply of coating material. Spray gun 406 may include a spray gun stand 407 for positioning spray gun 406 on floor 430. The system may include a spindle 410 for holding an object. Spindle 410 may include a spindle stand 413 for positioning spindle 410 in front of spray gun nozzle 408. Spindle 410 may include fingers 411 configured to receive a golf ball 412. First net 414, second net 416, and third net 418 may be adjacent spindle stand 413 in a position opposite spray gun stand 407. First net 414 may include first legs 420 connecting first net 414 to floor 430. To allow removal and/or replacement of first net 414, first net 414 may be removably attached to first legs 420 or floor 430. Second net 416 may include second legs 422 connecting second net 416 to floor 430. To allow removal and/or replacement of second net 416, second net 416 may be removably attached to second legs 422 or floor 430. Third net 418 may include third legs 424 connecting third net 418 to floor 430. To allow removal and/or replacement of third net 418, third net 418 may be removably attached to third legs 424 or floor 430.

Figure 10:
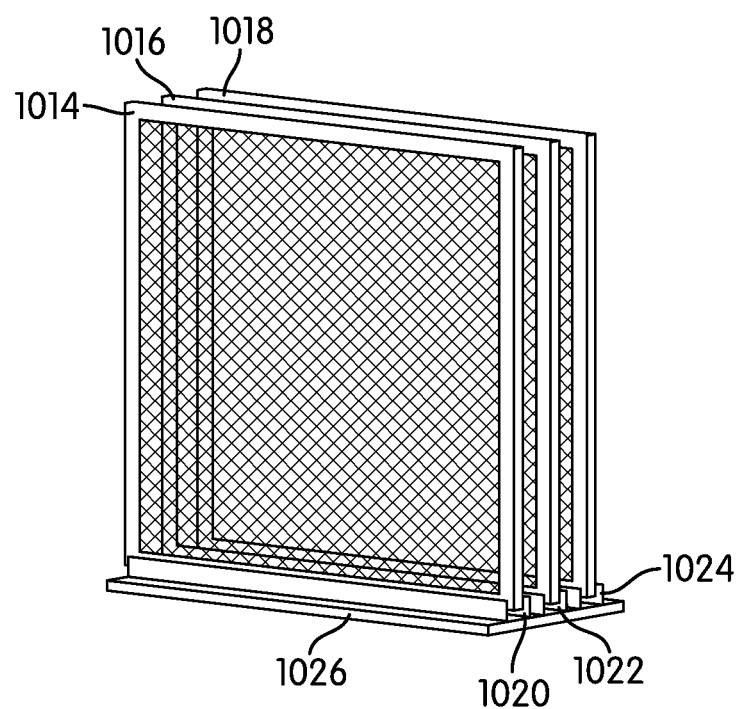
FIG. 10 is an exemplary embodiment of nets and a base.

In some embodiments, first net 114, second net 116, and third net 118 may be provided in cartridges that slide into slots provided inside booth 102. Such cartridges may each include single or multiple nets. FIG. 10 shows an exemplary embodiment in which nets include cartridges that may slide into slots provided on a base 1026. Base 1026 may include a first slot 1020, a second slot 1022, and a third slot 1024. First slot 1020 may receive a first net 1014. Second slot 1022 may receive second net 1016. Third slot 1024 may receive third net 1018. In some embodiments, slots may be formed on a floor and/or a ceiling of a booth.

As mentioned above, compartment 139 may house pump 138. Pump 138 may be connected to tube 142. Tube 142 may be in fluid communication with a source of solvent. The solvent may include any known type of solvent. For example, the solvent may include cyclohexane, cyloalkene, water, aliphatic hydrocarbons, ethyl acetate, glycol ethers, acetone, or any other known solvent. The solvent may have a boiling point higher than 65 degrees Celsius. The solvent may be selected based on the properties of the coating material used by the system. For example, the solvent may be a solvent in which the coating material is soluble. As shown in FIG. 1, the solvent may be provided in a solvent tank 144 disposed beneath booth 102. Tube 142 may be in fluid communication with solvent tank 144. Pump 138 may include a nozzle 140 disposed adjacent sloped wall 132. Nozzle 140 may be configured to discharge solvent onto sloped wall 132. As paint travels through the air from spray gun 106, the solvent in the paint evaporates causing paint to dry. Pump may pump solvent from solvent tank 144 onto sloped wall 132 to dissolve overspray that has dried on sloped wall 132, thus decreasing the viscosity of the overspray and encouraging the overspray to flow down toward booth drain 128. In some embodiments, pump 138 may continuously discharge solvent onto sloped wall 132. In some embodiments, pump 138 may be connected to a controller programmed to activate pump 138 at set intervals. For example, pump 138 may be activated every five minutes. In another example, pump 138 may be activated at any time spray gun 106 is spraying. In some embodiments, an operator may activate pump 138. For example, an operator may monitor the spraying process and activate pump 138 when overspray is beginning to accumulate on sloped wall 132. In some embodiments, pump 138 may be connected to a closed loop system including at least one sensor configured to sense when overspray has accumulated on sloped wall 132. These embodiments may further include a controller to activate pump 138 when the at least one sensor senses that overspray has accumulated on sloped wall 132.

In some embodiments, the system may include multiple pumps for discharging solvent onto walls. For example, as shown in FIG. 4, the system may include three pumps having nozzles disposed adjacent wall 431. A first nozzle 440 may be disposed opposite a spray gun nozzle 108 of a spray gun 406. A second nozzle 441 and a third nozzle 443 may be disposed in positions adjacent first nozzle 440. The positioning of the pumps and nozzles may be selected based on a variety of factors. For example, the positioning of the pumps may be based on path of the coating material. The positioning of the pumps and nozzles may also be selected based on a variety of factors. For example, the quantity of pumps may be selected based on the type of coating material or solvent used.

In some embodiments, a solvent may be discharged out of the nets to decrease the viscosity of overspray captured by the nets. For example, as shown in FIGS. 5 and 6, first net 514, second net 515, third net 516, fourth net 517, and fifth net 518 may each be connected to a source of solvent by tubes 551. The source of solvent may include a tank 549 filled with solvent and disposed above a ceiling 529 of a booth 502. Tank 549 may be positioned in a location other than above ceiling 529. For example, tank 549 may be disposed inside the booth, beneath the booth, or next to the booth. The solvent may include any known type of solvent. For example, the solvent may include cyclohexane, cyloalkene, water, aliphatic hydrocarbons, ethyl acetate, glycol ethers, acetone, or any other known solvent. The solvent may have a boiling point higher than 65 degrees Celsius. The solvent may be selected based on the properties of the coating material used by the system. For example, the solvent may be a solvent in which the coating material is soluble. First net 514, second net 515, third net 516, fourth net 517, and fifth net 518 may include a plurality of openings 553 located in the frames of the nets. The solvent may be dispensed from tank 549 into the frames of the nets. The solvent may then be discharged out of openings 553 and onto the nets. As the solvent runs down the nets, the solvent may cause dried overspray to become more fluid again and flow down the nets. Thus, the solvent may prevent overspray from building up on the nets and/or may help rinse overspray from the nets.

As mentioned above, the system may include a vessel for collecting and/or treating overspray. Referring back to FIG. 1, the vessel may include an overspray collection tank 146. Overspray collection tank 146 may be disposed beneath floor of booth 102. Booth drain 128 may be open to overspray collection tank 146 to allow overspray and/or solvent to drain from booth 102 into overspray collection tank 146. Inner walls 147 of overspray collection tank 146 may be coated with a nonstick surface to prevent reclaimed paint from adhering to inner walls 147. The nonstick coating may include any known material that is incompatible with the coating material. For example, the nonstick coating may include polytetrafluoroethylene (PTFE) or silicone. As described below in more detail, overspray collection tank 146, may provide a source of paint for spray gun 106.

As mentioned above, throughout the spraying process, solvent may tend to evaporate causing the paint to become viscous. Thus, decreasing the viscosity of the reclaimed paint with solvent may make reclaimed paint have properties similar to that of new paint. A pump 148 may be disposed with a nozzle 150 opening into overspray collection tank 146. Pump 148 may be connected to a tube 152 in fluid communication with a source of solvent. In some embodiments, a source of solvent may be designated for use with only pump 148. In other embodiments, as shown in FIG. 1, solvent tank 144 may be designated for use with both pump 138 and pump 148. Tube 152 may be in fluid communication with solvent tank 144. A flow meter 154 may be disposed within overspray collection tank 146. For example, flow meter 154 may be disposed adjacent a reclaimed paint drain 162 on the bottom of overspray collection tank 146. The proximity of flow meter 154 to reclaimed paint drain 162 may be selected based on a variety of factors. For example, the proximity of flow meter 154 to reclaimed paint drain 162 may be selected based on the properties of the coating material used, the temperature of the overspray collection tank 146, or the abilities of flow meter 154. In some embodiments, flow meter 154 may be disposed directly above reclaimed paint drain 162.

Flow meter 154 may measure the volumetric flow rate of fluid within overspray collection tank 146. This measurement may be indicative of the viscosity of reclaimed paint residing inside overspray collection tank 146. To provide a closed loop system, an electronic pump controller 158 may be electrically connected to flow meter 154 and pump 148 by a wire 160. A signal indicative of the volumetric flow rate measured by flow meter 154 may be communicated to electronic pump controller 158. When the signal indicates that the volumetric flow rate is below a predetermined limit, electronic pump controller 158 may activate pump 148 to add solvent to overspray collection tank 146 to decrease the viscosity of the reclaimed paint residing within overspray collection tank 146.

In some embodiments, in place of electronic pump controller 158, a person may read the measurement from flow meter 154 and activate pump 148 when the volumetric flow rate is below the predetermined limit. In other embodiments, flow meter 154 and pump 148 may be mechanically linked to one another. This connection may allow pump 148 to be activated when a mechanical output by flow meter 154 indicates that the volumetric flow rate is below the predetermined limit.

As mentioned above, the system may include conduits for directing overspray to be reused. As shown in FIG. 1, one conduit may include a reclaimed paint tube 166. Reclaimed paint tube 166 may be in fluid communication with reclaimed paint drain 162 to withdraw reclaimed paint from overspray collection tank 146. A filter 164 may be disposed adjacent reclaimed paint drain 162 to filter dried paint and any other particles of debris or contaminants out of the reclaimed paint as it is withdrawn from overspray collection tank 146.

The system may include a vessel for storing new paint. As shown in FIG. 1, the vessel may include a new paint tank 168. New paint tank 168 may be disposed beneath booth 102 to provide another source of paint for spray gun 106. Inner walls 169 of new paint tank 168 may be coated with a nonstick surface to prevent new paint from adhering to inner walls 169. The nonstick coating may include any known material that is incompatible with the new paint. For example, the nonstick coating may include polytetrafluoroethylene (PTFE) or silicone. Another conduit of the system may include a new paint tube 170. New paint tube 170 may be disposed within new paint tank 168 to withdraw new paint. New paint may be mixed with reclaimed paint before being sprayed from spray gun nozzle 108.

As mentioned above, the system may include flow controllers for directing overspray to be reused. As shown in FIG. 1, a flow controller may include a diverter valve 172. New paint tube 170 and reclaimed paint tube 166 may be connected by diverter valve 172. Diverter valve 172 may include a first inlet 174, a second inlet 176, and an outlet 178. Reclaimed paint tube 166 may be connected to first inlet 174 and new paint tube 170 may be connected to second inlet 176.

Another conduit of the system may include a pump tube 180. Pump tube 180 may be connected to outlet 178 at one end and a pump 182 at a second end. Pump 182 may pump new paint through new paint tube 170 and reclaimed paint through reclaimed paint tube 166. Diverter valve 172 may include a diverter valve element 188 preventing reclaimed paint from entering new paint tube 170 and new paint from entering reclaimed paint tube 166. The position of diverter valve element 172 may also control the amount of flow coming from overspray collection tank 146 and new paint tank 168. Reclaimed paint and new paint may mix together at outlet 178 and enter pump tube 180. Pump 182 may pump this mixture to spray gun 106 via a spray gun tube 190.

Another flow controller of the system may include a valve 184. Valve 184 may be disposed within reclaimed paint tube 166 between reclaimed paint drain 162 and first inlet 174. Valve 184 may be connected to an electronic valve controller 186 that controls how much valve 184 opens. Electronic valve controller 186 may control valve 184 to adjust the amount of reclaimed paint pumped by pump 182 and mixed with new paint. The amount of reclaimed paint pumped by pump 182 and mixed with new paint may be based on a ratio of reclaimed paint to new paint (parts by weight). The ratio of reclaimed paint to new paint may be in the range of about 20:80 to 80:20. The ratio of reclaimed paint to new paint may depend on a variety of factors. For example, the ratio may depend on temperature or other factors that may affect viscosity or the average viscosity of the reclaimed paint.

In some embodiments, in place of electronic valve controller 186, a person may manually control how much valve 184 opens to adjust the amount of reclaimed paint pumped by pump 182 and mixed with new paint. In other embodiments, valve 184 may be mechanically configured to automatically adjust the amount of reclaimed paint pumped by pump 182 and mixed with new paint.

In an exemplary embodiment, the method of using system 100 may include pump 182 pumping paint from new paint tank 168 through spray gun nozzle 108 onto golf ball 112. If overspray collection tank 146 is empty, diverter valve element 188 may swing fully open to new paint tube 170 to allow paint to be drawn entirely from new paint tank 168. If overspray collection tank 146 has reclaimed paint in it and valve 184 is open, diverter valve element 188 may be positioned to allow paint to be drawn from both new paint tank 168 and overspray collection tank 146. As paint is sprayed from spray gun nozzle 108, first net 114, second net 116, and third net 118 may catch overspray as golf ball 112 is being coated. Overspray not caught by first net 114, second net 116, and third net 118 may slide down sloped wall 132 through booth drain 128 and into overspray collection tank 146. Pump 138 may pump solvent from solvent tank 144 onto sloped wall 132 to increase the viscosity of paint that has dried through the spraying process, thus encouraging overspray to flow down booth drain 128.

As reclaimed paint inside overspray collection tank 146 flows past flow meter 154 toward drain, flow meter 154 may measure the volumetric flow rate of the reclaimed paint. Flow meter 154 may send a signal indicative of the volumetric flow rate to electronic pump controller 158. When the signal indicates that the volumetric flow rate is below a predetermined limit, electronic pump controller 158 may activate pump 148 to add solvent to overspray collection tank 146 to decrease the viscosity of the reclaimed paint residing within overspray collection tank 146. Pump 148 may continue to add solvent to overspray collection tank 146 until flow meter 154 sends a signal to electronic pump controller 158 that is indicative of a volumetric flow rate above the predetermined limit. As discussed above, in place of electronic pump controller 158, a person may read the measurement from flow meter 154 and activate pump 148 when the volumetric flow rate is below the predetermined limit. In other embodiments, flow meter 154 and pump 148 may be mechanically linked to one another. This connection may allow pump 148 to be activated when a mechanical output by flow meter 154 indicates that the volumetric flow rate is below the predetermined limit.

As reclaimed paint as it is withdrawn from overspray collection tank 146, filter 164 may filter paint and any other particles from the reclaimed paint. Valve 184 and electronic valve controller 186 may adjust the amount of reclaimed paint withdrawn from overspray collection tank 146 based on a ratio of reclaimed paint to new paint. As discussed above, in place of electronic valve controller 186, a person may manually control how much valve 184 opens to adjust the amount of reclaimed paint pumped by pump 182 and mixed with new paint. In other embodiments, valve 184 may be mechanically configured to automatically adjust the amount of reclaimed paint pumped by pump 182 and mixed with new paint.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A system for coating an object with material, comprising:
    a housing having a floor and at least one wall extending upwardly from the floor, the entire floor being solid;
    a discharging device disposed within the housing;
    at least one porous material disposed between the discharging device and the at least one wall;
    a holder for holding the object disposed within the housing;
    a first tank disposed beneath the floor of the housing; and
    a drain disposed in the floor of the housing.

2. The system according to claim 1, wherein the holder is configured to hold a golf ball.

3. The system according to claim 2, wherein the holder comprises a spindle.

4. The system according to claim 1, wherein the discharging device comprises a spray nozzle.

5. The system according to claim 1, wherein the at least one porous material comprises a plurality of porous materials disposed between the discharging device and the at least one wall.

6. The system according to claim 5, wherein the plurality of porous materials include between two and ten porous materials.

7. The system according to claim 6, wherein the distance between each of the plurality of porous materials is within a range of about 0.5 cm to 10 cm.

8. The system according to claim 1, wherein the first tank includes a nonstick surface.

9. The system according to claim 1, further comprising a pump having a nozzle positioned to spray solvent inside the first tank.

10. The system according to claim 1, wherein the first tank is in fluid communication with the discharging device.

11. The system according to claim 1, further comprising:
    a second tank for supplying coating material disposed beneath the floor of the housing.

12. The system according to claim 11, wherein the first tank and the second tank are both in fluid communication with the discharging device.

13. The system according to claim 12, further comprising:
    a first tube in fluid communication with the second tank;
    a second tube in fluid communication with the first tank, wherein the first tank is a collection tank for collecting overspray;
    a first valve, comprising;
    a first inlet connected to the first tube;
    a second inlet connected to the second tube; and
    an outlet for mixing the flow from the first tube with the flow from the second tube.

14. The system according to claim 13, wherein the outlet is connected to a third tube in fluid communication with the discharging device.

15. The system according to claim 13, further comprising a second valve disposed within the second tube.

16. The system according to claim 1, wherein the housing includes a plurality of vertical walls extending from a perimeter of the floor.

17. The system according to claim 1, wherein the floor is curved toward the drain.

18. The system according to claim 1, wherein the holder is disposed between the discharging device and the at least one porous material.

19. The system according to claim 1, wherein the at least one porous material is disposed on the floor or above the floor.

20. The system according to claim 1, wherein the at least one porous material comprises a net.

21. The system according to claim 1, wherein the at least one porous material has a pore size within a range of about 0.5 mm to 5 mm.

* * * * *